DERIVATION OF TWICE LINE FREQUENCY FROM SUB-CARRIER GENERATOR

Filed Sept. 5, 1962

INVENTOR.
ALBERT J. BARACKET
BY Gillette + Virgil
ATTORNEYS

United States Patent Office 3,170,036 Patented Feb. 16, 1965

3,170,036

DERIVATION OF TWICE LINE FREQUENCY FROM SUB-CARRIER GENERATOR

Albert J. Baracket, Cedar Grove, N.J., assignor to Diamond Power Specialty Corporation, Lancaster, Ohio, a corporation of Ohio Filed Sept. 5, 1962, Ser. No. 221,462
4 Claims. (Cl. 178—69.5)

This invention relates to means for generating a relative low-frequency signal the frequency of which is not an integral multiple of the low frequency. In particular it relates to the generation of a signal having a frequency closely approximating twice the horizontal line frequency of a standard, commercial television system and controlling the frequency of the generated signal by a high frequency signal which serves also as a sub-carrier for color information.

In accordance with this invention the output signal of a precisely controlled oscillator is connected to a chain of bistable, or binary, circuits, or flip-flops, to divide the frequency of the signal by an integral number. The resultant low frequency signal is then applied to a chain of multipliers to multiply the low frequency back to a higher value which is not an integral sub-multiple of the original frequency. Because of the relatively high original frequency, at least the initial binary stages must be capable of rapid response and this is achieved in the transistorized circuits of this invention by the addition of diodes between the common input to the two transistors of a binary stage and collectors of the transistors.

The invention will be described in greater detail in the following specification together with the drawing in which.

Figure 1:
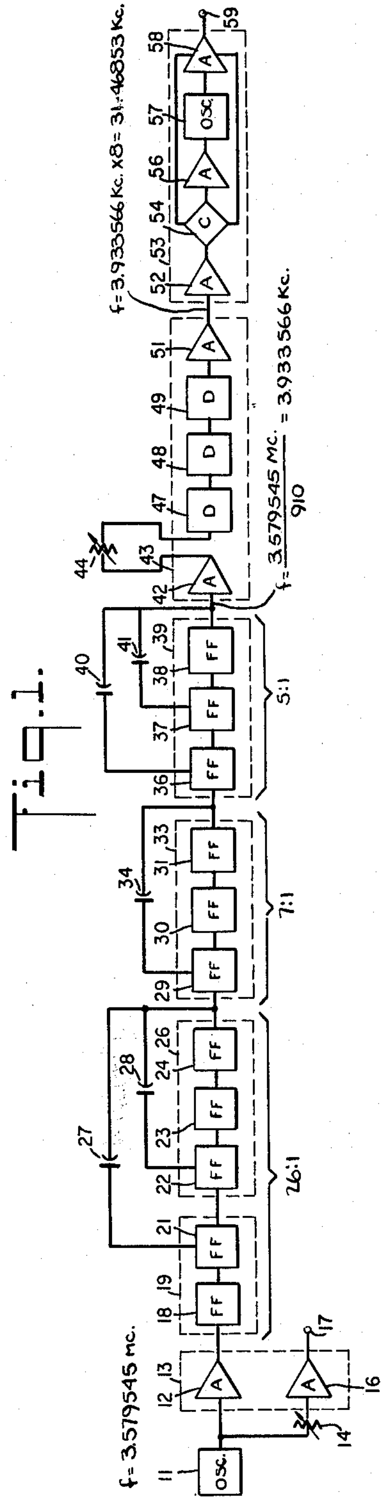
FIG. 1 is a block diagram of one embodiment of the sub-carrier generator of the present invention.

In FIG. 1 the initial signal is generated in an oscillator 11 and the frequency of this signal is very accurately controlled to a value of 3.579545 megacycles per second, or mc., to use the common abbreviation. This is the standard frequency set by governmental regulation for color sub-carriers. Oscillator 11 is connected to an amplifier 12 on a sub-chassis 13 and, via a potentiometer 14, to a second amplifier 16 on the same sub-chassis. The output of the latter amplifier is made available at a terminal 17 for such use as may be desired in other circuits not directly related to the present invention.

Amplifier 12 is connected to a first flip-flop 18 on a sub-chassis 19, and the output of this flip-flop is connected to a second flip-flop 21 on the same sub-chassis. The latter flip-flop is connected to a series of three flip-flops 22–24 on another sub-chassis 26. The output pulse signal of the last of these flip-flops 24 is connected by a capacitor 27 to a second input circuit of the flip-flop 21 and by means of a capacitor 28 to the flip-flop 22. As a result of these feedback capacitors, the operation of the flip-flops on the two sub-chassis 19 and 26 is changed from the normal frequency division of 32:1 to 26:1. In accordance with the teachings of my co-pending application entitled Frequency Dividing Circuits, the capacitors 27 and 28 are not located on the sub-chassis 19 and 26 but on a main chassis.

The output terminal of flip-flop 24 is connected to the first of three serially connected flip-flops 29–31 on a sub-chassis 33. This sub-chassis may be identical with sub-chassis 26, and preferably is, to obtain the advantages of standardized production and reduced inventory. The normal 8:1 frequency division to be expected from a three-stage binary circuit such as that on sub-chassis 33 is modified to 7:1 by a feedback capacitor 34.

The last flip-flop 31 on sub-chassis 33 is connected to a final series of flip-flops 36–38 on a sub-chassis 39. Again, this sub-chassis may be identical with the two preceding ones. This time, however, the normal frequency division ratio of 8:1 is reduced to 5:1 by means of two feedback capacitors 40 and 41 connected from the output flip-flop 38 to flip-flop 36 and flip-flop 37, respectively. Multiplying the ratios of all of the frequency dividing sub-chassis together gives an overall ratio of 900:1, so that the repetition rate, or frequency, of pulses at the output of flip-flop 38 is 3579545/910, or 3933.56 cycles per second.

The last flip-flop 38 is connected to an amplifier 42 on a sub-chassis 43. If desired, the amplifier 42 may be tuned to the fundamental frequency of the output pulse wave of flip-flop 38 so as to furnish a signal of better waveform for the voltage doublers to follow. The output of amplifier is connected to a volume control 44, which, as indicated, need not be on the sub-chassis 43. This is not for the purpose of standardized production, but simply to facilitate placement of the controls in the equipment.

The output of the volume control is connected to a series of three frequency doublers 47–49 so that the frequency of the output signal is eight times that of the signal at the output of the last flip-flop 38. Thus the frequency at the output of the last doubler 49 is 31,468.48 cycles per second, which is very close to the standard black and white commercial television equalizing pulse frequency of 31,500 cycles per second and is close enough so that circuits designed for operation at the latter frequency will operate just as well at a slightly lower frequency. It may be noted that the effect of the doublers 47–49 is to multiply the frequency by two in each doubler whereas the effect of each individual flip-flop was to divide the frequency by two. However, the operation of the flip-flop stages was modified from the normal binary value so that the result differed from simple division by two. The output of the final doubler 49 is applied to amplifier 51 which serves, among other things, to isolate the last doubler from succeeding circuits.

The output of the amplifier 51 is connected to another amplifier 52 on a sub-chassis 53. This sub-chassis contains circuits that make up a phase-locked oscillator the purpose of which is to generate a signal of the desired frequency substantially the same as the equalizing frequency of a television system. In accordance with standard phase-locked oscillator practice the amplifier 52 is connected to a four-diode bridge circuit 54 the output of which is connected to another amplifier 56 which is capable of passing only extremely low frequency signals. The output of the amplifier 56 is applied to an oscillator 57 to control the operation thereof in accordance with the phase-lock principle and the output of this oscillator is connected to a final amplifier 58 which supplies the output signal to an output terminal 59 and also supplies signals of opposite phase to the bridge circuit 54.

Figure 2:
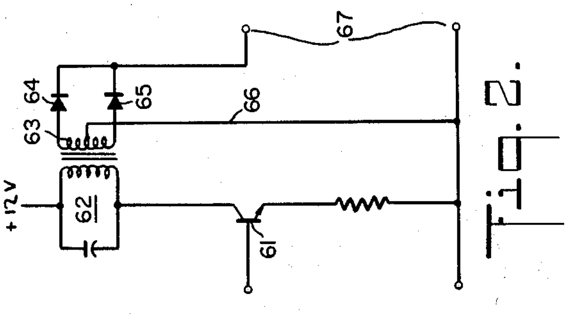
FIG. 2 shows a frequency-doubling stage in the circuit of FIG. 1.

FIG. 2 shows a schematic diagram of one of the doubler stages on the sub-chassis 43. This doubler comprises a transistor 61 operated as a grounded emitter amplifier with the input signal applied to the base thereof. This transistor is operated as a tuned amplifier with a tuned circuit 62 connected to the collector and inductively coupled to a secondary 63 which is connected as a full-wave rectifier circuit having two diodes 64 and 65. The winding 63 is center-tapped and the center-tap is connected to a common buss 66. The effect of full-wave rectification is to enhance the second harmonic in the output signal and this signal is then applied to the next doubler or amplifier by way of a pair of output terminals 67.

Figure 3:
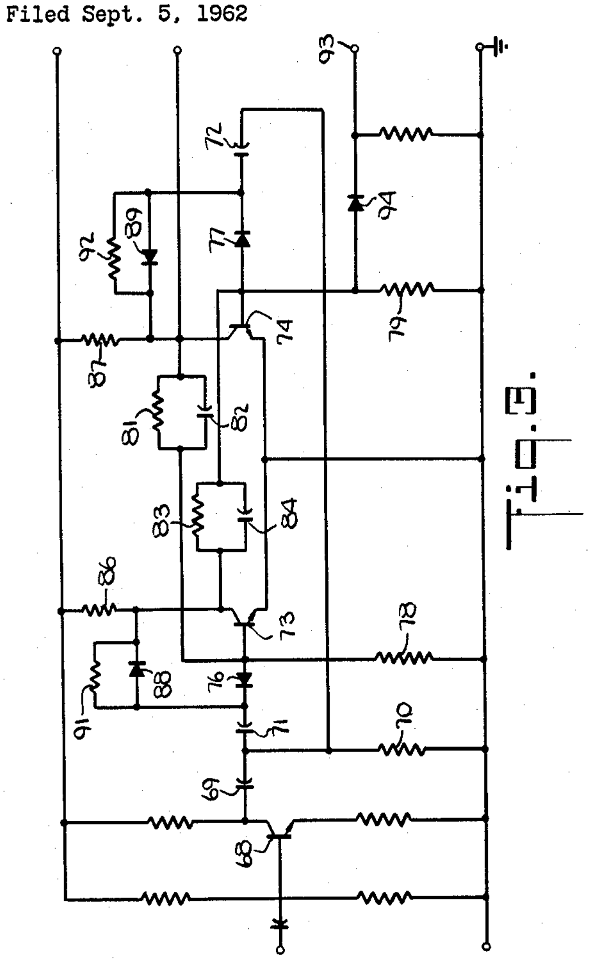
FIG. 3 shows a binary stage suitable for high frequency operation.

FIG. 3 illustrates a typical one of the flip-flops, for example flip-flop 21 of FIG. 1. In addition to the bistable portion of the circuit, the complete circuit in FIG. 3 also includes an isolation amplifier 68. The output of the transistor 68 is connected by means of a differentiating circuit, including a capacitor 69 having a relatively low capacitance and a resistor 70, to a pair of capacitors 71 and 72 at the inputs of two transistors 73 and 74 respectively. Between the capacitors 71 and 72 and their respective transistors are two diodes 76 and 77, respectively, which are polarized so as to transmit negative-going signals to the bases of the transistors 73 and 74. The bases of the transistors are connected to ground by means of a pair of resistors 78 and 79 and the base of transistor 73 is connected to the collector of transistor 74 by means of a feedback resistor 81 and parallel with a small capacitor 82 which serves to increase the speed of operation of the circuit. A similar resistor 83 in parallel with a similar capacitor 84 is connected between the collector of transistor 73 and the base of transistor 74. The collector load resistors of the two transistors are indicated by reference characters 86 and 87, respectively.

A diode 88 is connected between the junction of capacitor 71 and diode 76 and the collector of transistor 73, while a similar diode 89 is connected between the junction of the capacitor 72 and the diode 77 and the collector of transistor 74. The diodes 88 and 89 are so polarized as to be conductive when the terminal connected to the collector is negative with respect to the other terminal of the diode. The diodes are paralleled by resistors 91 and 92, respectively. Another input circuit consisting of an input terminal 93 and diode 94 are connected to the base of transistor 74, and the latter diode is so polarized as to transmit negative-going pulses, only, to the transistor 74.

It is to be noted that the two transistors 73 and 74 are NPN transistors which means that in order to be conductive the base of the transistor must be slightly positive with respect to the emitter and the collector must be positive with respect to the base. In order to describe the operation of this circuit it may be assumed that transistor 73 is conductive and transistor 74 is nonconductive. Therefore current will be flowing through transistor 73 and through its collector load resistor 86 which will make the collector negative with respect to the operating voltage, which, in the circuit shown, is approximately 12 volts. There is practically no current flowing through the load resistor 87 because of the fact that the transistor 74 to which it is connected is nonconductive. However, a very small current will flow, as required to bias the base of transistor 73 to conductivity, by way of a circuit including the resistor 87 and the resistor 81. Essentially, however, the collector of transistor 74 is nearly at the level of the power supply voltage and as a result capacitor 72 will charge up to the same voltage, provided that there is time to do so. When a negative-going signal is supplied to the capacitor 69, it is immediately transmitted through the capacitor 71 and the diode 76 to the base of transistor 73 thereby reducing the conductivity of that transistor. At the same time the same signal is connected by way of the capacitor 72 and the diode 77 to the base of transistor 74, but since this transistor is already nonconductive the application of a negative-going signal to its base will have no further effect. The dimunition of conductivity of the transistor 73 tends to reduce the current through the load resistor 86 and therefore tends to reduce the voltage thereacross. This produces a positive-going signal which is transmitted to the base of transistor 74 by means of the feedback circuit including resistor 83 and capacitor 84. This signal raises the voltage of the base of transistor 74 and renders that transistor somewhat conductive which in turn causes the voltage level at the collector thereof to reduce by virtue of the newly produced voltage drop across the load resistor 86. The negative-going signal at the collector of transistor 74 is connected back to the base of transistor 73 by way of the feedback resistor 81 and capacitor 82 and this further reduces the conductivity of transistor 73 in the well-known regenerative manner of operation. As a result transistor 73 becomes completely non-conductive.

At the same time a change must take place in the charge of the two capacitors 71 and 72. Initially the charge on capacitor 71 was smaller than that on capacitor 72 by virtue of the fact that the capacitor 71 could only charge up to the small voltage between the collector of transistor 73 and ground whereas the capacitor 72 could charge up almost to the full supply voltage of the circuit. The voltage across the capacitor 71 is less than this full supply voltage by the amount of voltage drop across resistor 86.

After the reversal of conductivity from transistor 73 to transistor 74, the capacitor 72 must discharge to a lower voltage level. This is accomplished by way of the circuit including diode 89 which permits charge to drain from the capacitor 72 quite rapidly and much more rapidly than would be possible if the charge had to be dissipated through the resistor 92. Conversely, the diode 88 greatly assists in discharging the capacitor 71, and the result of adding the two diodes 88 and 89 to the circuit is to improve markedly the high-frequency operation of the flip-flop. This is quite important in the case of flip-flops operating at a repetition frequency of several megacycles, as is particularly true of flip-flops 18 and 21. It is also advantageous in the case of flip-flops operating at lower frequencies, since it sharpens, or makes more rapid and definite, the operations of such flip-flops. Thus the circuit of FIG. 3 may be used for any of the flip-flops in FIG. 1.

While this invention has been described in specific terms, it will be apparent that it is not so limited, but that modifications may be made in the embodiment shown which will still be within the true scope of the invention as defined by the following claims.

What is claimed is:

1. An oscillation generator for a color television system, said generator comprising: an oscillator producing oscillations at a predetermined, relatively high frequency; a plurality of binary counters connected in series with a first one of said counters connected to said oscillator to be controlled by a signal derived therefrom and to reduce the repetition rate of said signal to a predetermined submultiple; a plurality of frequency multipliers connected in series, a first one of said multipliers being connected to the last of said binary counters, said multipliers producing a signal having a repetition rate which is not an integral sub-multiple of said signal derived from said oscillator, the repetition rate of the signal produced by said multipliers being substantially twice as great as the repetition rate of the horizontal synchronizing signal of said television system.

2. An oscillation generator for a color television system, said generator comprising: an oscillator producing oscillations at a predetermined, relatively high frequency; a plurality of binary counters connected in series with a first one of said counters connected to said oscillator to be controlled by a signal derived therefrom and to reduce the repetition rate of said signal to a predetermined submultiple; a plurality of frequency multipliers connected in series, a first one of said multipliers being connected to the last of said binary counters, said multipliers producing a signal having a repetition rate which is not an integral sub-multiple of said signal derived from said oscillator, the repetition rate of the signal produced by said multipliers being substantially twice as great as the repetition rate of the horizontal synchronizing signal of said television system; and a phase-locked oscillator connected to the last of said multipliers to be controlled by the output signal therefrom.

3. An oscillation generator for a color television system, said generator comprising: an oscillator producing oscillations at a predetermined, relatively high frequency; a plurality of binary counters connected in series with a first one of said counters connected to said oscillator to be controlled by a signal derived therefrom and to reduce the repetition rate of said signal to a predetermined sub-multiple; feedback means connected to said series of counters to modify the division ratio produced thereby to a value different from its normal, binary value; a plurality of frequency doublers connected in series, a first one of said multipliers being connected to the last of said binary counters, said multipliers producing a signal having a repetition rate which is not an integral sub-multiple of said signal derived from said oscillator the repetition rate of the signal produced by said multipliers being substantially twice as great as the repetition rate of the horizontal synchronizing signal of said television system.

4. An oscillation generator for a color television system, said generator comprising: an oscillator producing oscillations at a predetermined, relatively high frequency; a plurality of flip-flop circuits connected in series with a first one of said counters connected to said oscillator to be controlled by a signal derived therefrom and to reduce the repetition rate of said signal to a predetermined sub-multiple; each of said flip-flop circuits comprising a pair of transistors connected as a bistable circuit, said bistable circuit including a pair of capacitors connected to the respective bases of said pair of transistors to supply control signals thereto, and a pair of diodes connected, respectively, in series between collector of one of said transistors and the connection from the corresponding one of said capacitors to the base of the same transistor, each of said diodes being polarized to conduct current when the transistor to which it is connected becomes conductive; and a plurality of frequency multipliers connected in series, a first one of said multipliers being connected to the last of said flip-flop circuits, said multipliers producing a signal having a repetition rate which is not an integral sub-multiple of said signal derived from said oscillator, the repetition rate of the signal produced by said multipliers being substantially twice as great as the repetition rate of the horizontal synchronizing signal of said television system.

No references cited.